US006181995B1

(12) United States Patent
Luper et al.

(10) Patent No.: US 6,181,995 B1
(45) Date of Patent: Jan. 30, 2001

(54) VEHICLE STATE MILEAGE DETERMINATION SYSTEM

(75) Inventors: Jack F. Luper; Stanley J. Thomas, both of Winston-Salem, NC (US)

(73) Assignee: Eaton Corporation, Cleveland, OH (US)

( * ) Notice: Under 35 U.S.C. 154(b), the term of this patent shall be extended for 0 days.

(21) Appl. No.: 09/399,247

(22) Filed: Sep. 20, 1999

Related U.S. Application Data

(63) Continuation of application No. 08/763,375, filed on Dec. 13, 1996, now Pat. No. 5,954,773.

(51) Int. Cl.[7] .......... G06F 7/00

(52) U.S. Cl. .......... 701/35; 701/201; 701/207; 701/213; 701/225; 340/438

(58) Field of Search .......... 701/35, 201, 207, 701/213, 202, 214, 215, 216, 225; 340/438, 988, 990, 995

(56) References Cited

U.S. PATENT DOCUMENTS 5,359,528 * 10/1994 Haendel et al. .......... 701/35
5,612,875 * 3/1997 Haendel et al. .......... 701/35
5,694,322 * 12/1997 Westerlage et al. .......... 705/417
5,954,773 * 9/1999 Luper .......... 701/35
5,970,481 * 10/1999 Westerlage et al. .......... 705/417

* cited by examiner

*Primary Examiner*—William A. Cuchlinski, Jr.
*Assistant Examiner*—Gertrude Arthur
(74) *Attorney, Agent, or Firm*—Charles E. Kosinski

(57) ABSTRACT

A system and method for monitoring and recording the number of miles that a vehicle has traveled within each of a set of geographic entities. A vehicle position determination system is installed on-board the vehicle for generating a present vehicle location point. A memory is provided for storing for each of the entities a set of ordered coordinate data points representing the boundary of the entity. A processor is coupled with the position determination system and the memory for comparing the present vehicle location point to the boundary coordinate data points of an entity, including generating a ray emanating from the location point and determining if said ray crosses the boundary of the entity an even or odd number of times.

10 Claims, 4 Drawing Sheets

VEHICLE STATE MILEAGE DETERMINATION SYSTEM

This is a continuation of U.S. patent application Ser. No. 08/763,375, filed Dec. 13, 1996, now U.S. Pat. No. 5,954,773.

BACKGROUND OF THE INVENTION

The present invention relates generally to on-board vehicle systems and, more particularly, to a system and method for determining which state a vehicle is presently in and for monitoring, recording and reporting the mileage driven by a vehicle in a particular state.

With the advent of vehicle fleet management and monitoring systems, elaborate computerized communication systems directed at automatically obtaining and recording vehicle location and a wide variety of other information as a vehicle covers its route, numerous on-board computer systems have evolved. The information collected by these systems can be used for a myriad of purposes which encompass automated customer billing systems, computerized dispatching, trip reporting and other such tasks. One type of information available from an on-board vehicle computer is the present location of the vehicle in terms of its geographic latitude and longitude coordinates. One particularly prevalent way of obtaining this data is through a global positioning system (GPS) receiver which captures positional information from signals transmitted over satellite.

However, oftentimes it is necessary to convert the raw coordinate data into a more useful form which provides additional information such as what state, city, province, county or other defined geographical territory the vehicle is traveling in. This information is particularly useful in various fleet and trucking applications such as in performing automated road use tax calculations as well as various trip reporting functions. However, even when coordinate data for the boundary lines of various geographic entities has been pre-stored in memory, the process of individually comparing the current location coordinates to boundary coordinate data for each entity, in order to determine whether the current point lies within that boundary, can become quite computer intensive.

SUMMARY OF THE INVENTION

The vehicle state mileage determination system of the present invention includes a vehicle position determination system installed on-board the vehicle for generating a present vehicle location point. A memory is provided for storing, for each of a set of predefined geographic entities, a set of ordered coordinate data points representing the boundary of the entity. A processor is coupled with the position determination system and the memory for comparing the present vehicle location point to the boundary coordinate data points of an entity, including generating a ray emanating from the location point and determining if said ray crosses the boundary of the entity an even or odd number of times.

These and other features and advantages of the present invention will become apparent upon review of the following description taken in conjunction with the accompanying drawings.

DETAILED DESCRIPTION OF THE PREFERRED EMBODIMENT

This is a continuation of application Ser. No. 08/763,375, filed Dec. 13, 1996, the disclosure of which is hereby incorporated herein by reference.

Figure 1:
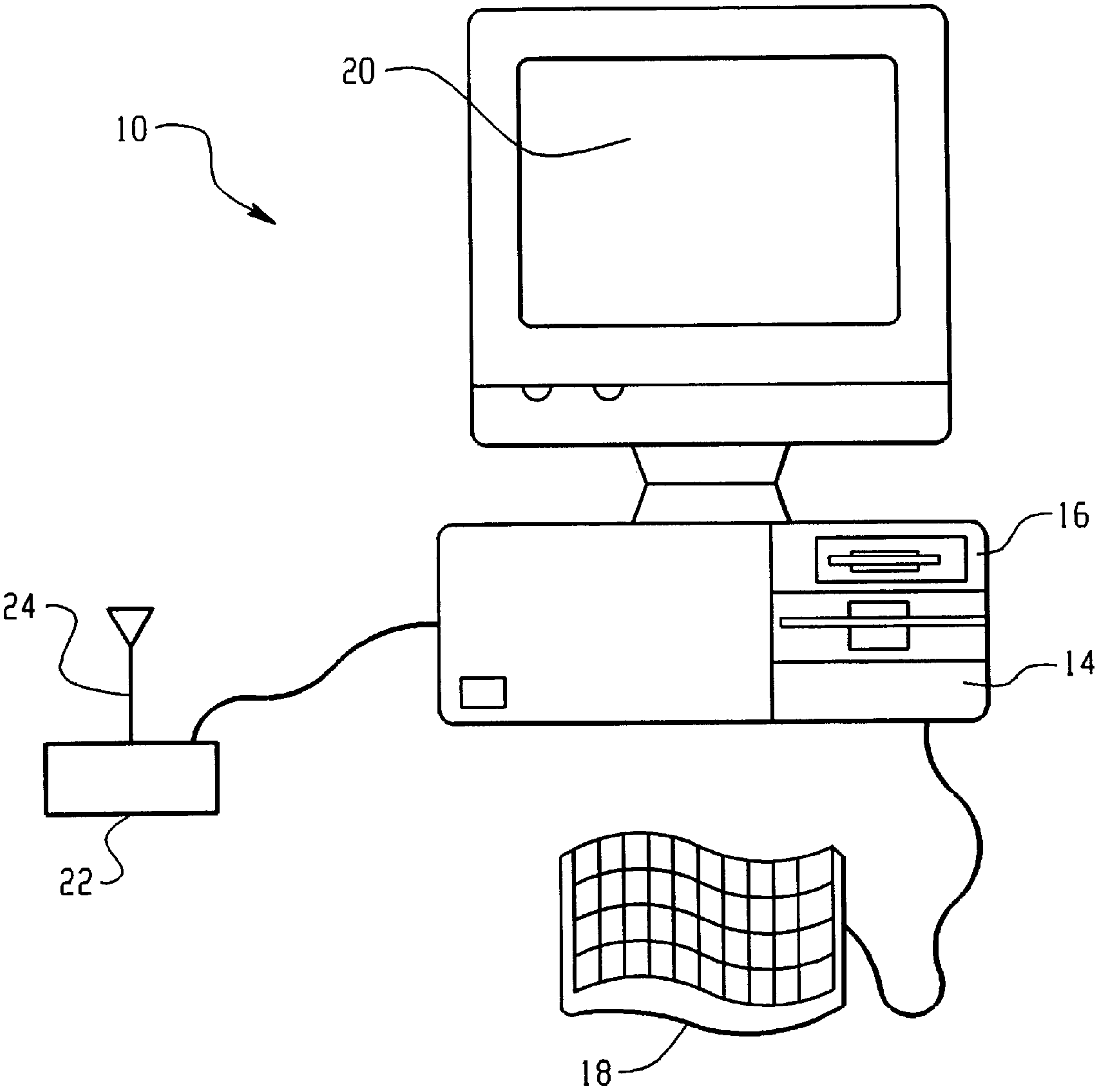
FIG. 1 is a schematic view of the hardware components of the present invention.

Turning now to the drawings, and in particular to FIG. 1, a system made in accordance with the present invention is indicated generally at 10. System 10 includes a microprocessor-based on-board computer (OBC) 12, preferably installed in the passenger compartment of a vehicle (i.e. a truck cab) and positioned to provide convenient interaction with the driver and/or passenger of the vehicle. OBC 12 is preferably configured and packaged so as to provide reliable operation in a vehicle cab environment and includes memory means 14, preferably both read only memory (ROM) and random access memory (RAM). OBC 12 also includes one or more auxiliary data storage means, such as a PCMCIA card reader 16, and a means for providing interactive communication with a user, preferably including a touch screen or keyboard 18 and a visual display 20. OBC 12 also includes, or alternatively is coupled to, a transceiver 22 for receiving data via an antenna 24 from a transmitter which provides geographical location data, such as from a GPS satellite (not shown) or other location determination system such as Loran.

Stored in memory 14 of OBC 12 is coordinate data indicative of the borders of each of a set of geographical entities. While each of these entities for purposes herein will hereinafter be referred to as a "state", it should become readily apparent that the system and method of the present invention are equally well suited for uses involving other types of geographic entities as well, such as countries, counties, cities or any other type of defined geographic territories. Each "state" border is preferably represented as a closed polygon formed of a plurality of connected line segments. In this exemplary embodiment, the vertices formed at points where two segments meet are each stored as an x-y coordinate pair in an Albers Equal-Area Conic projection system. However, using this format requires a conversion if the system used for position data input is a GPS system or otherwise provides data in the form of latitude and longitude coordinates. While this data format is the one preferred for the present invention, it should become readily apparent and well known to those working in the art that any other convenient data format could alternately be utilized.

For the preferred implementation of the present invention, this state boundary data is stored in memory 14 in five object classes, the first being a "point" preferably an x,y coordinate although another suitable coordinate representation could alternately be used. The second object class is a "line segment", which contains an ordered sequence of points which represent a portion of a state border which may or may not be shared with another state. Some line segments may contain only two points, some may contain several hundred points. As a result, a line segment is preferably implemented using a count of the number of points and a pointer to an array of points. A third object class is the "segment table" which contains an array of line segments. A line segment table could contain all the line segments needed to construct the boundary of a single state, a group or subset of states, or all states.

A "state" object contains a list of integer indices to a line segment table. By following these indices into the line segment table, the exact points defining a particular state's boundary can be extracted. These indices are preferably positive in sign to indicate that the corresponding line segment should be followed in the forward direction and negative to indicate that the corresponding line segment should be followed in the reverse direction in order to construct a state's border. Each state file also includes x,y coordinate extremes of a bounding rectangle.

The fifth object is a "state location" object which includes a "line segment table" containing all the state border data available. It also keeps track of the last point successfully located and a "state" object for the most recent state identified containing a list of all the points making up the border of that state. This list is of critical importance in determining whether or not a point is contained in a particular state. While this data storage structure has been implemented in the exemplary embodiment of the present invention described herein, a number of alternative data organization schemes should also be apparent to one of skill in the art.

To minimize data storage requirements, especially with an on-board implementation, as well as to improve efficiency and speed, the state boundary data and associated rectangle coordinate points can be further segmented and organized. The data can be segmented into "regions" or state subsets, and if desired only that subset of states which the application will need to access can be loaded on-board for storage into memory 14, rather than loading all of the available state boundary information. This is particularly useful where a vehicle may have a route which includes only a specific region of the country or a specific set of states. The selected subsets could be changed as needed, loading other subsets or all the data in from a suitable auxiliary storage means, such as CD ROM or disk, or by downloading. Preferably, a choice of regions would be presented to a user in the form of a graphical display constructed from the various regions and state boundary line data and implemented in a manner well known to those of skill in the art.

In addition, any number of data compression schemes known to those of skill in the art can also be used, but any such scheme must be simple and fast since the data must be extracted and utilized quickly in the final on-board implementation. For instance, a scheme based on the acceptable tolerance level for the system can be employed, creating a tradeoff between precision and data set size which is directly controllable by the user. A user may specify the acceptable level at which the loss of resolution can be tolerated, preferably expressed in a convenient form such as in terms of meters. If a tolerance of 200 meters is acceptable, for example, all coordinate boundary points within 200 meters of a straight line connecting the neighboring points on either side of that point are eliminated from the data set.

Figure 2:
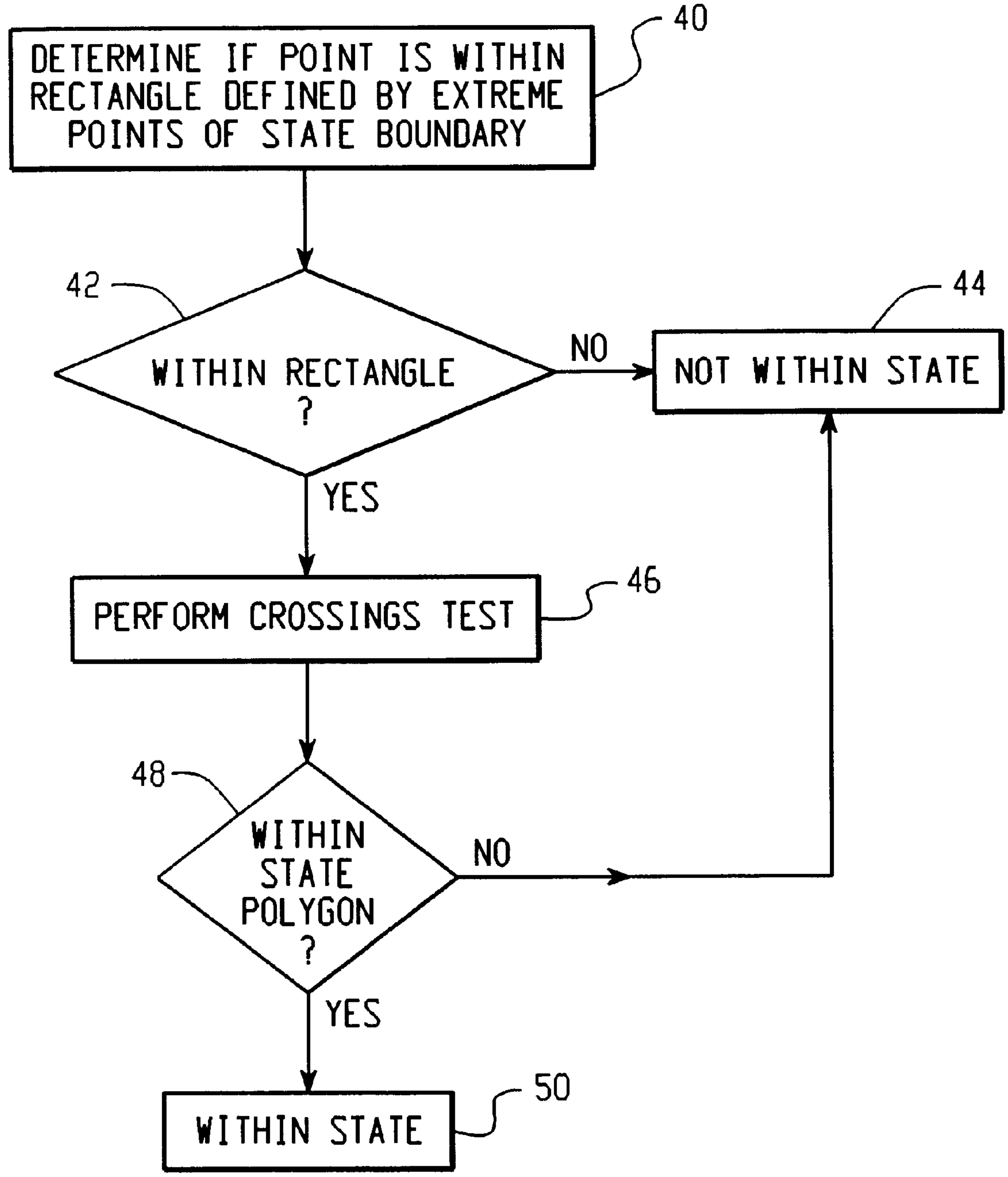
FIG. 2 is a flow chart illustrating the method by which the system shown in FIG. 1 determines whether a given point lies within the boundary of a certain geographical entity such as a state.

Turning now to FIG. 2, the method by which OBC 12 determines whether a vehicle location point lies within the boundary of any given state is illustrated by flow chart. This method is preferably performed utilizing software running on OBC 12 but could also be done remotely by transferring data as needed between OBC 12 and a central computer (not shown) or using any other suitable means. Beginning at block 40 with current position point acquired through transceiver 22, OBC 12 converts the acquired point into an appropriate coordinate system (if required) and then checks to see if the current point falls within a rectangle defined approximately by extreme points of a state boundary, the particular state being chosen as set forth in detail below.

The extreme points for a particular state are preferably chosen so that the rectangle created thereby completely encompasses the given state's boundary. These points are preferably stored in the state object. Since many states have very irregular borders, it is likely that the imaginary rectangles may overlap and a given vehicle location point will fall within the rectangle defined for more than one state. However, this stage is mainly an approximation, directed primarily at eliminating states from consideration.

If the point is not found to be in the rectangle defined for a particular state in decision block 42, an indication that the point is not within the given state is given at block 44 and this information is used in another part of the routine as will be described below. Although a rectangle is utilized in the presently preferred embodiment described herein, and is the most convenient shape for use with a rectangular coordinate system since only two points are needed to define a rectangle, any other convenient polygonal shape could also be used, such as a triangle or hexagon. Various types of polygons could also be used in a single system with an appropriate polygonal shape being selected to best encompass a given state's border.

If, however, a present vehicle location point is determined to be within the bounds of the selected rectangle in decision block 42, a "crossings test" is performed at 44 to make a more definite determination as to whether the present point lies within the boundary of the suggested state. This test is one known to those of skill in the art wherein a ray is constructed in an arbitrary cardinal direction from the point being tested. If that ray crosses the state border an odd number of times, the point is determined to fall within that state. If, on the other hand, the number of crossings is even, the point is determined to not be within the state. While this is the method used in the presently preferred embodiment described herein, any other similar method known to those of skill in the art could alternately be used.

This state determination method is advantageous in that the rectangle test is fast and requires only a few simple comparisons. Although for the crossings test the data representing the state border may contain hundreds of line segments, the test can be implemented in such a way that it is extremely efficient, taking only a fraction of a second to test a single state. Borders of adjacent states preferably include the same collection of points where the states touch and each border preferably forms a continuous closed loop. Gaps in the border data could cause an error with the crossings test while gaps between borders could create a situation where a vehicle is determined to be "between" adjacent states.

Figure 3:
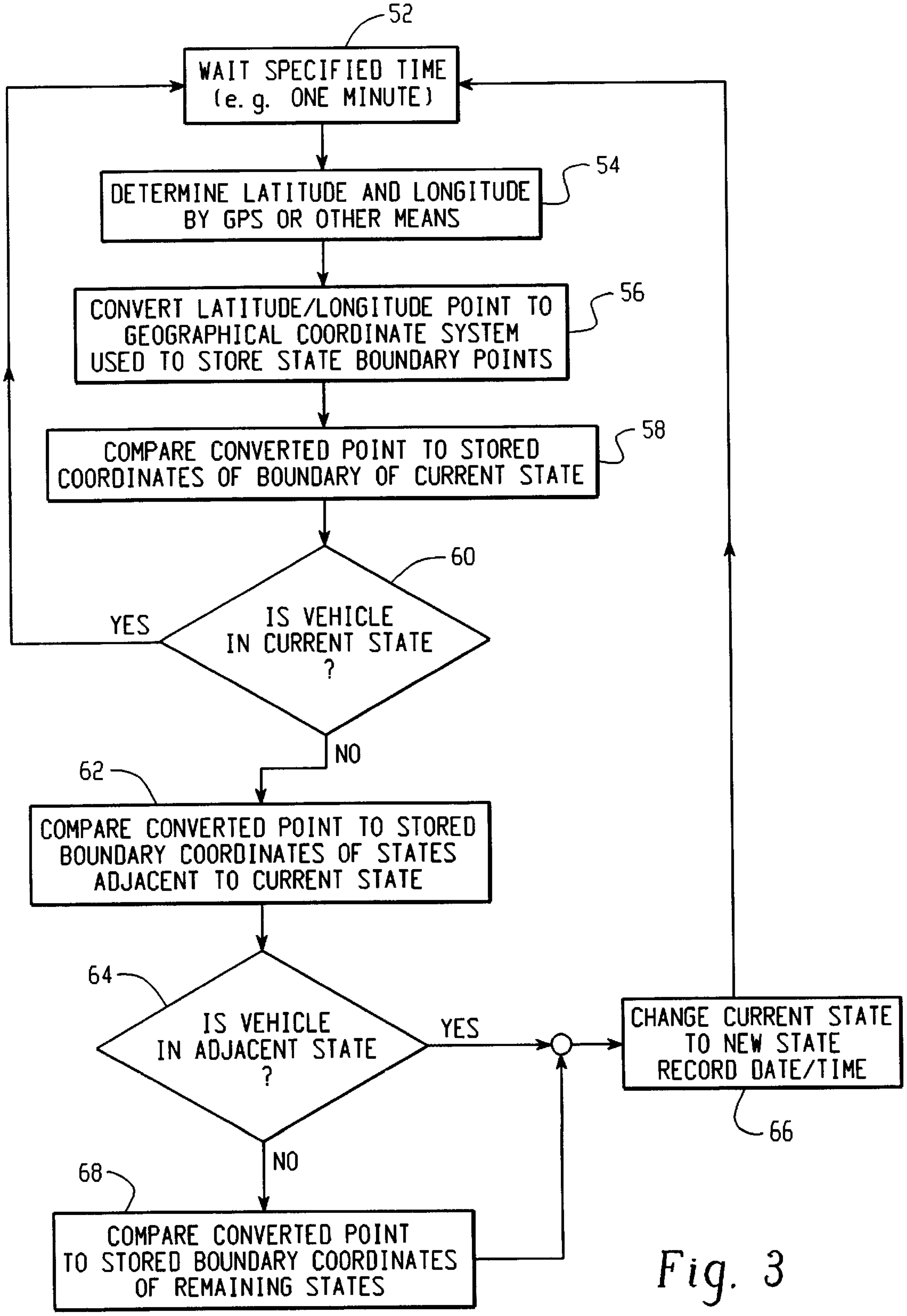
FIG. 3 is a flow chart similar to that in FIG. 2 illustrating a method by which the current state is determined.

Turning now to the flow chart of FIG. 3, the process of monitoring the state in which a vehicle is traveling begins at block 52 wherein a specified time period is allowed to expire, this period being about one minute in this exemplary embodiment but alternately being any convenient amount depending upon the system accuracy desired. At block 54 a current position reading is obtained. This reading can be received through transceiver 22 from a global positioning system (GPS) or any other convenient means and may be in the form of latitude and longitude, or in any other available format. In the present embodiment, the point data received from the GPS system is in the form of latitude/longitude and is converted into the coordinate system in which the state boundary line coordinates are stored at 56.

At block 58, the method illustrated in FIG. 2 is performed, wherein it is determined whether the vehicle is in the current state, i.e. the same state as it was during the previous iteration of this routine. If the vehicle is in the same state at decision block 60, control returns to block 52 and the process repeats upon the expiration of the set time period, until it is determined at block 60 that the vehicle has moved into another state. If this is the case, additional states are selected and the process of FIG. 2 is repeated using the newly selected states until a new current state is confirmed at block 62. Preferably adjacent states are selected but the selected states may be determined according to any appropriate method known or obvious to one having requisite skill in the art. The selection of additional states to be tested can also be further narrowed by utilizing other available information such as the general direction the vehicle was heading or the point at which a state boundary line was crossed.

If the vehicle, as indicated by the present location point, is found to be in the suggested adjacent state at decision block 64, the adjacent state becomes the current state and OBC 12 records additional associated information such as the date and time. If the present position point is not found to be in a given adjacent state at decision block 64, the process of FIG. 2 is again carried out with additional states until a new state is found and confirmed. If a new state is never confirmed, an appropriate error handling routine known to those of skill in the art can be employed. For instance, all states for which data is available may be checked in order. If no state is found, the present position data point is compared to a previously verified point. If the new point is within a certain distance, say 800 meters, of the previous point, it is assumed that the vehicle is still in the same state as the previous point. The only reason, generally, that this test needs to be used, is to overcome errors caused by small gaps between border lines for neighboring states. Such an error handling routine is preferably implemented as part of software block 68.

Figure 4:
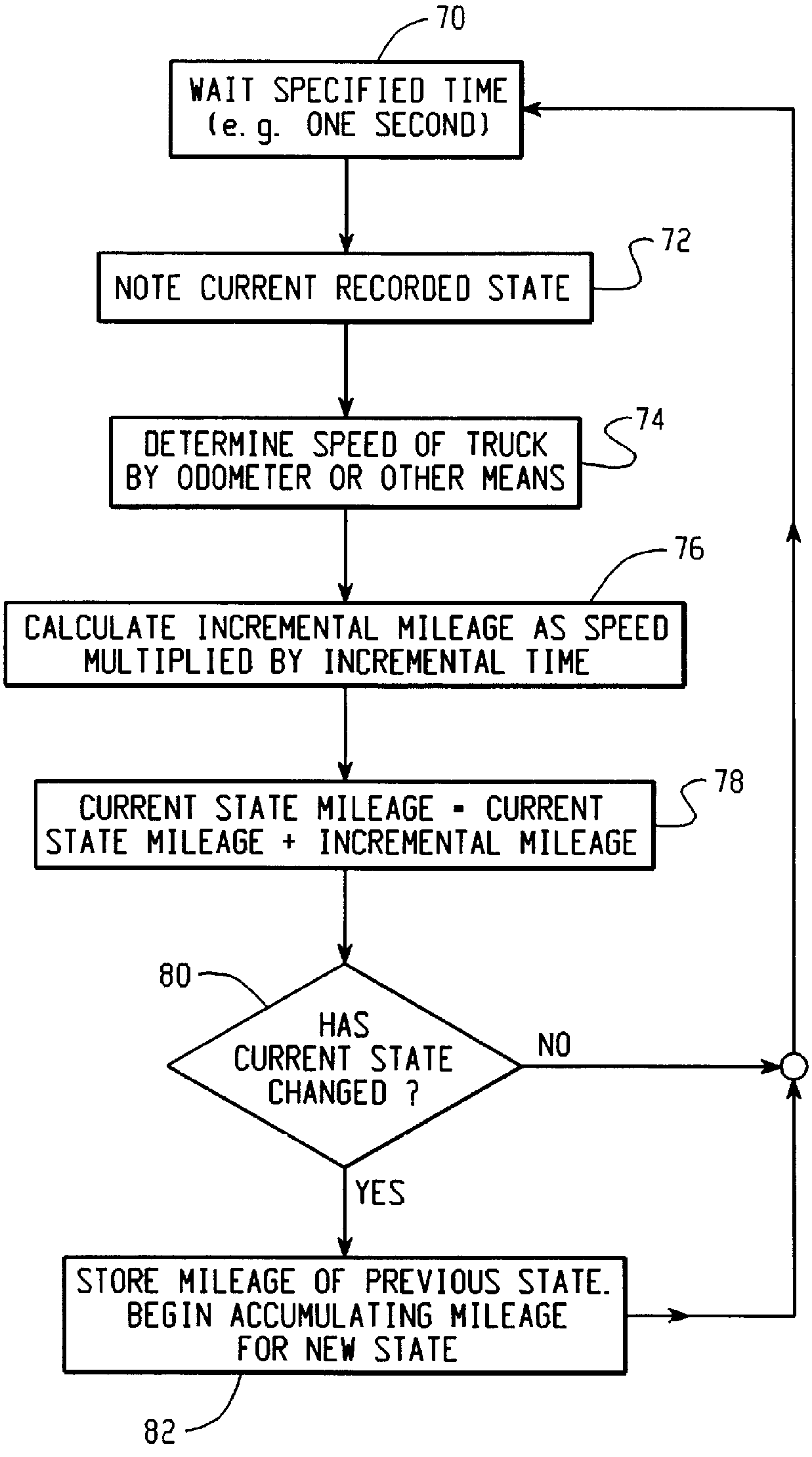
FIG. 4 is a flow chart illustrating a preferred method by which the present system records and reports the total mileage traveled by a vehicle within a given state.

FIG. 4 shows the method by which, given an identified state that a vehicle is in, OBC 12 records the mileage driven by the vehicle within that state. After a specified period of time expires at block 70, the current state is noted at block 72. The speed of the vehicle is obtained by OBC 12 at 74, such as by using the vehicle's speedometer or other readily available means. An incremental mileage is calculated at 76 as the sensed speed multiplied by incremental time (i.e. the time expired since the last measurement was taken). While speed will vary somewhat, especially in a city, by keeping the time period of block 70 sufficiently small, overall system accuracy can be controlled. A current state mileage value, preferably stored in an addressable register of OBC 12, is updated in block 78 as the current mileage plus the incremental mileage found in block 76. Alternately, however, any other suitable method for keeping track of vehicle mileage, such as by using information provided by the vehicle's odometer could also be used.

At decision block 80, OBC 12 checks to determine whether the current state has changed since the previous iteration of this routine. If it has not, the above-described process is repeated and the mileage for that state continues to accumulate. However, once the state has changed, the mileage traveled in the previous state is stored and the mileage counter zeroed out so as to begin incrementing again as the vehicle travels in the new state. In addition to calculating mileage as an alternative, the present system could keep track of the time elapsed during travel within a particular state or any other parameter deemed to be of interest. The accuracy of the information obtained is directly related to that of the various sensors employed as well as the time period of block 70.

The methods by which the various types of data gathered by this system are utilized can vary from system to system. For instance, in one preferred implementation of the present invention, all calculations are made on-board the vehicle using boundary line data stored in OBC memory. The mileage accumulated for each state can be stored on-board or transmitted via antenna 24 to a ground station for use and/or long term storage. Alternately, however, the data could be retained on-board for subsequent transfer to another computer using a batch storage device such as PCMCIA card or disk. Any or all OBC tasks could instead be performed off-board by another computer having the state boundary information stored therein and simply transmitting the vehicle location data to that computer. Obviously, a wide variety of variations and system configurations are possible within the confines of the present invention.

Thus, the system and method of the present invention provide an effective way to keep track of mileage driven by a vehicle in each of a number of states. The calculations are kept to a minimum to achieve results without requiring elaborate hardware or extensive software operations. Accuracy can be directly controlled and increased by manipulating certain set time periods to update the recorded information more often.

The foregoing discussion discloses and describes merely an exemplary embodiment of the present invention. One skilled in the art will readily recognize from such discussion, and from the accompanying drawings and claims, that various changes and modifications can be made therein without departing from the spirit and scope of the present invention as defined by the following claims.

What is claimed is:

1. A system for monitoring the travel of a vehicle within a set of predefined geographic entities and determining in which of the entities the vehicle is presently located, wherein the location of the vehicle and the boundaries of the entities can be defined by coordinate data points in a common coordinate system, said system comprising:

a vehicle position determination system installed on-board the vehicle for generating a present vehicle location point;

a memory storing for each of the entities a set of ordered coordinate data points representing the boundary of the entity; and a processor coupled with said position determination system and said memory for comparing said present vehicle location point to said boundary coordinate data points of an entity including generating a ray emanating from said location point and determining if said ray crosses the boundary of the entity an even or odd number of times.

2. The system of claim 1 further comprising a transceiver and antenna coupled to said position determination system for transmitting said present vehicle location point to an off-board computer.

3. The system of claim 1 wherein said position determination system is a global positioning system.

4. A system for monitoring the travel of a vehicle within a set of predefined geographic entities and determining in which of the entities the vehicle is presently located, wherein the location of the vehicle and the boundaries of the entities can be defined by coordinate data points in a common coordinate system, said system comprising:

a vehicle position determination system installed on-board the vehicle for generating a present vehicle location point;

a memory, said memory storing for each of the entities a set of ordered coordinate data points representing the boundary of the entity, and at least three coordinate data points wherein said points can be joined to form an imaginary polygon which substantially encloses said geographic entity boundary; and a processor coupled with said position determination system and said memory for comparing said present vehicle location point to at least one set of said polygon coordinate data points and, for a said polygon having said location point lying therein, comparing said location point to said boundary coordinate data points of the entity corresponding to said polygon including generating a ray emanating from said location point and determining if said ray crosses the boundary of the entity an even or odd number of times.

5. The system of claim 4 wherein said at least three coordinate data points comprise the coordinate extremes of said boundary coordinate data points of an entity.

6. The system of claim 4 wherein said at least three coordinate data points comprises substantially fewer data points than said set of boundary coordinate data points.

7. The system of claim 4 wherein said imaginary polygon is a rectangle.

8. The system of claim 4 further comprising a transceiver and antenna coupled to said position determination system for transmitting said present vehicle location point to an off-board computer.

9. The system of claim 4 wherein said position determination system is a global positioning system.

10. A method for monitoring and recording the number of miles that a vehicle has traveled within each of a set of predefined geographic entities wherein the location of the vehicle and the boundaries of the entities can be defined by coordinate data points in a common coordinate system, the method comprising the steps of:

providing a geographic position sensor on-board the vehicle, said position sensor for providing an electrical signal including a present vehicle location coordinate data point which is indicative of the present geographical location of the vehicle;

for each geographic entity:

storing a set of ordered coordinate data points representing the boundary of the entity;

storing at least three coordinate data points wherein said points can be joined to form an imaginary polygon which substantially encloses said geographic entity boundary; and providing a storage location for storing the accumulated mileage traveled by the vehicle within the boundary of the entity; and for said present vehicle location coordinate data point:

comparing said location point to a set of said polygon coordinate data points to determine whether said location point lies on or within a said imaginary polygon;

for a said imaginary polygon having said location point lying thereon or therein, comparing said location point to said boundary coordinate data points of the entity corresponding to said polygon including generating a ray emanating from said location point and determining if said ray crosses the boundary of the entity an even or odd number of times; and if said ray crosses said entity boundary an odd number of times, determining incremental mileage traveled by the vehicle and adding said incremental mileage to said stored accumulated mileage for the entity.

* * * * *